United States Patent
Wood et al.

(10) Patent No.: US 9,785,573 B2
(45) Date of Patent: *Oct. 10, 2017

(54) SYSTEMS AND METHODS FOR STORAGE OF DATA IN A VIRTUAL STORAGE DEVICE

(71) Applicant: Profitbricks GmbH, Berlin (DE)

(72) Inventors: Conrad N. Wood, Berlin (DE); Achim Weiss, Berlin (DE)

(73) Assignee: Profitbricks GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,470

(22) Filed: May 9, 2016

(65) Prior Publication Data

US 2016/0253267 A1    Sep. 1, 2016

Related U.S. Application Data (63) Continuation of application No. 14/200,764, filed on Mar. 7, 2014, now Pat. No. 9,361,171.

(51) Int. Cl.
*G06F 11/00* (2006.01)
*G06F 12/1009* (2016.01)
(Continued)

(52) U.S. Cl.
CPC ............ *G06F 12/1009* (2013.01); *G06F 3/06* (2013.01); *G06F 11/0727* (2013.01);
(Continued)

(58) Field of Classification Search
CPC ... G06F 11/3006; G06F 3/064; G06F 11/1484
See application file for complete search history.

(56) References Cited

U.S. PATENT DOCUMENTS 6,363,421 B2  3/2002  Barker et al.
8,146,147 B2  3/2012  Litvin et al.
(Continued)

FOREIGN PATENT DOCUMENTS

EP  2 413 549 A1  2/2010
EP  2 482 496 A1  8/2012

OTHER PUBLICATIONS

U.S. Appl. No. 13/835,013, filed Mar. 15, 2013, Weiss et al.
(Continued)

*Primary Examiner* — Charles Ehne
(74) *Attorney, Agent, or Firm* — Daly Crowley Mofford & Durkee (57) ABSTRACT

A system for providing data storage includes at least one virtual server comprising at least one virtual storage device; at least one physical server comprising at least one physical storage device; a data structure, stored on each of the at least one physical storage devices, the data structure comprising: at least one table of contents, the table of contents configured to map storage locations within the virtual storage device to node structures that provide pointers to corresponding storage locations within the physical storage device; a tree structure having a predetermined number of hierarchical levels, each level containing node structures, the node structures containing pointers that point to other node structures or to data locations on the physical storage device; and one or more core software modules.

21 Claims, 7 Drawing Sheets

(51) Int. Cl.
| | |
|---|---|
| *G06F 11/07* | (2006.01) |
| *G06F 11/14* | (2006.01) |
| *G06F 11/30* | (2006.01) |
| *G06F 17/30* | (2006.01) |
| *G06F 3/06* | (2006.01) |
| *G06F 12/02* | (2006.01) |

(52) U.S. Cl.
CPC ...... *G06F 11/0775* (2013.01); *G06F 11/1484* (2013.01); *G06F 11/3006* (2013.01); *G06F 12/023* (2013.01); *G06F 17/30* (2013.01); *G06F 2212/1044* (2013.01); *G06F 2212/152* (2013.01); *G06F 2212/154* (2013.01); *G06F 2212/651* (2013.01)

(56) References Cited

U.S. PATENT DOCUMENTS

| | | | |
|---|---|---|---|
| 8,479,266 | B1 | 7/2013 | Delker et al. |
| 8,484,355 | B1 | 7/2013 | Lochhead et al. |
| 8,612,744 | B2 | 12/2013 | Shieh |
| 9,154,327 | B1 | 10/2015 | Marino et al. |
| 2002/0122394 | A1 | 9/2002 | Whitmore et al. |
| 2005/0066225 | A1* | 3/2005 | Rowan ............... G06F 11/1435 714/5.11 |
| 2005/0076264 | A1* | 4/2005 | Rowan ............... G06F 11/1469 714/6.12 |
| 2005/0120160 | A1 | 6/2005 | Plouffe et al. |
| 2006/0047923 | A1 | 3/2006 | Kodama |
| 2006/0047998 | A1* | 3/2006 | Darcy ................. G06F 3/061 714/6.12 |
| 2006/0101221 | A1 | 5/2006 | Harada |
| 2006/0155708 | A1 | 7/2006 | Brown et al. |
| 2007/0028244 | A1* | 2/2007 | Landis ................. G06F 9/5016 718/108 |
| 2009/0112919 | A1 | 4/2009 | De Spiegeleer |
| 2010/0070731 | A1 | 3/2010 | Mizuno et al. |
| 2011/0066823 | A1* | 3/2011 | Ando .................. G06F 3/0605 711/171 |
| 2011/0271010 | A1 | 11/2011 | Kenchammana et al. |
| 2012/0030404 | A1* | 2/2012 | Yamamoto ............ G06F 3/0605 711/6 |
| 2012/0144014 | A1 | 6/2012 | Natham et al. |
| 2012/0207174 | A1 | 8/2012 | Shieh |
| 2013/0019018 | A1 | 1/2013 | Rice |
| 2013/0136126 | A1 | 5/2013 | Wang et al. |
| 2013/0263120 | A1* | 10/2013 | Patil .................... G06F 9/45558 718/1 |
| 2013/0263125 | A1 | 10/2013 | Shamsee et al. |
| 2014/0101657 | A1 | 4/2014 | Bacher et al. |
| 2014/0108655 | A1 | 4/2014 | Kumar et al. |
| 2014/0359245 | A1* | 12/2014 | Jones ................... G06F 12/023 711/170 |
| 2015/0254007 | A1* | 9/2015 | Wood .................... G06F 3/0619 711/114 |
| 2016/0112258 | A1 | 4/2016 | Zhou et al. |

OTHER PUBLICATIONS

U.S. Appl. No. 14/200,784, filed Mar. 7, 2014, Wood et al.
U.S. Appl. No. 14/200,751, filed Mar. 7, 2014, Wood et al.
U.S. Appl. No. 14/200,935, filed Mar. 7, 2014, Wood et al.
U.S. Appl. No. 14/200,948, filed Mar. 7, 2014, Wood et al.
Invitation to Pay Additional Fees for PCT/2014/027112 dated Jul. 3, 2014.
PCT Search Report and Written Opinion of the ISA dated Sep. 9, 2014; for PCT Pat. App. No. PCT/US2014/027112; 14 pages.
Office Action dated Jul. 2, 2015; for U.S. Appl. No. 13/835,013; 16 pages.
Notice of Allowance dated Oct. 2, 2015; for U.S. Appl. No. 14/200,935; 13 pages.
Office Action dated Oct. 23, 2015; For U.S. Appl. No. 14/200,751; 17 pages.
Response dated Nov. 2, 2015 to Office Action dated Jul. 2, 2015; For U.S. Appl. No. 13/835,013; 13 pages.
Office Action dated Dec. 4, 2015; For U.S. Appl. No. 14/200,948; 15 pages.
"SolarWinds Network Management Guide", Cisco System, Dec. 2010; 20 pages.
Final Office Action dated Feb. 9, 2016; for U.S. Appl. No. 13/835,013; 32 pages.
Response filed on Feb. 23, 2016 to Non-Final Office Action dated Oct. 23, 2015; for U.S. Appl. No. 14/200,751; 22 pages.
Non-Final Office Action dated Oct. 7, 2015; for U.S. Appl. No. 14/200,764; 16 pages.
Response filed on Feb. 7, 2016 to Non-Final Office Action dated Oct. 7, 2015; for U.S. Appl. No. 14/200,764; 12 pages.
Notice of Allowance dated Feb. 26, 2016; for U.S. Appl. No. 14/200,764; 11 pages.
Non-Final Office Action dated May 4, 2016; for U.S. Appl. No. 14/200,784; 21 pages.
Weil et al.: "Crush: Controlled, Scalable, Decentralized Placement of Replicated Data", Storage Systems Research Center; *IEEE*, Nov. 2006; 12 pages.
Notice of Allowance dated May 25, 2016; for U.S. Appl. No. 14/200,751, 10 pages.
Response filed on Jun. 22, 2016 to Final Office Action dated Feb. 9, 2016; for U.S. Appl. No. 13/835,013, 19 pages.
Response filed on Jun. 3, 2016 to Non-Final Office Action dated Dec. 4, 2015; for U.S. Appl. No. 14/200,948; 9 pages.
Final Office Action dated Aug. 11, 2016; for U.S. Appl. No. 14/200,948; 14 pages.
Applicant-Initiated Interview Summary dated Sep. 21, 2016; for U.S. Appl. No. 14/200,784; 3 pages.
Response filed on Oct. 3, 2016 to Non-Final Office Action dated May 4, 2016; for U.S. Appl. No. 14/200,784; 16 pages.
Applicant-Initiated Interview Summary dated Sep. 28, 2016; for U.S. Appl. No. 14/200,948; 3 pages.
Response with After Final Consideration Request filed on Oct. 11, 2016 to Final Office Action dated Aug. 11, 2016; for U.S. Appl. No. 14/200,784; 11 pages.
Advisory Action for U.S. Appl. No. 14/200,948 dated Oct. 28, 2016; 2 Pages.
Request for Continued Examination (RCE) for U.S. Appl. No. 14/200,948 filed on Nov. 14, 2016; 3 Pages.
Office Action dated Dec. 6, 2016 from U.S. Appl. No. 14/200,948; 9 Pages.
Applicant-Initiated Interview Summary dated Feb. 7, 2017 for U.S. Appl. No. 13/835,013; 3 Pages.
U.S. Final Office Action dated Jan. 11, 2017 for U.S. Appl. No. 14/200,784; 27 Pages.
Interview Summary dated Mar. 21, 2017 for U.S. Appl. No. 14/200,784; 3 Pages.
Response to U.S. Final Office Action dated Jan. 11, 2017 for U.S. Appl. No. 14/200,784; Response filed on Apr. 11, 2017; 12 Pages.
Non-Final Office Action dated Jul. 28, 2016; for U.S. Appl. No. 13/835,013; 35 pages.
U.S. Non-Final Office Action dated Aug. 11, 2017 for U.S. Appl. No. 14/200,784; 20 Pages.

* cited by examiner

SYSTEMS AND METHODS FOR STORAGE OF DATA IN A VIRTUAL STORAGE DEVICE

RELATED APPLICATIONS

This application is a CONTINUATION application of U.S. patent application Ser. No. 14/200,764 (filed Mar. 7, 2014), which is incorporated here by reference in its entirety.

FIELD

The concepts described herein relate generally to cloud storage systems (i.e. a group of networked physical storage devices and servers working in conjunction to provide a pool of physical storage to be shared among a number of different users) and more particularly to virtual storage drives within cloud storage systems.

BACKGROUND

As is known in the art, a data center is a facility used to house computer systems and associated components, such as telecommunications and storage systems. It generally includes redundant or backup power supplies, redundant data communications connections, redundant servers and storage devices, environmental controls (e.g., air conditioning, fire suppression) and security devices (collectively referred to as data center equipment).

As is also known, there is a trend to replace or consolidate multiple data center equipment, such as servers. One technique to consolidate resources is to simulate a hardware platform, operating system (OS), storage device, or other network resources (this method of consolidation may be referred to as "virtualization"). Here, a bank of computing resources (e.g. computing and/or storage devices) and host computers/servers are coupled together through an interface (typically implemented in software). The interface includes "front end" or host computer/server controllers (or storage processors) and "back-end" computing and/or storage device controllers.

The front-end software interface provides users with access to the back-end computing devices. The infrastructure implemented in the back-end is typically transparent to the user and abstracted by the front-end interface (i.e. the interface operates the controllers in such a way that they are transparent to the user and host computer/server). Thus, data (for example) may be stored in, and retrieved from a bank of disk drives in such a way that the host computer/server appears as if it is operating with a single drive. In other words, as long as the user receives the proper services through the virtual front-end, the user may not need to understand how the back-end implements those services. Virtualization technologies may also be used to create virtual desktops, which can then be hosted in data centers and leased to users on a subscription basis.

Such virtual front-ends can provide a user with access to virtual storage. For example, a user may store data onto a virtual hard drive provided by the front end interface. To the user, the virtual hard drive appears as a regular, physical hard drive or other physical storage medium. In the back-end, however, the data may be stored in one or more of a group of networked physical servers working in conjunction to provide a pool of physical storage (i.e. the aforementioned "cloud storage"). Thus, the data stored by a user onto the virtual storage drive may, in the back end, be stored on any one or more of the networked physical servers.

When conventional cloud storage systems deal with a large number of read/write transactions, an undesirably long period of time may be required to complete the transactions. This is due, at least in part, to the amount of overhead which exists in read/write transactions in conventional cloud storage systems. It would, therefore, be desirable to provide a system and technique to reduce the amount of time required to execute read/write transactions between a user and a cloud storage system.

SUMMARY

In accordance with the concepts described herein, a system for providing data storage includes at least one virtual server comprising at least one virtual storage device; at least one physical server comprising at least one physical storage device; a data structure, stored on each of the at least one physical storage devices, the data structure comprising: at least one table of contents, the table of contents configured to map storage locations within the virtual storage device to node structures that provide pointers to corresponding storage locations within the physical storage device; a tree structure having a predetermined number of hierarchical levels, each level containing node structures, the node structures containing pointers that point to other node structures or to data locations on the physical storage device; and one or more core software modules executed by one or more virtual machines, one or more physical machines or both and configured to receive requests to access data in the storage locations within the virtual storage device and, in response to the requests, traverse the data structure to access data in the corresponding storage locations within the physical storage device.

With this particular arrangement, a system for providing data storage which reduces overhead in read/write transactions in a cloud based storage system is provided. Utilizing a tree-based structure having a fixed number of levels reduces the amount of overhead required for read/write transactions and thereby provides improved performance when reading and/or writing data to cloud storage systems. By reducing the amount of overhead, a user perceives a faster operating experience when reading and/or writing data to network storage.

BRIEF DESCRIPTION OF THE DRAWINGS

The foregoing features of the concepts, systems and techniques described herein, may be more fully understood from the following description of the drawings. It should be noted that the drawings are provided as examples to assist in describing embodiments of the technology and concepts for which protection is sought. Other illustrations and embodiments may fall under the scope of the invention(s) described in this document. Thus, the drawings should not be construed to limit the scope of the invention.

Like numbers in the drawings denote like elements.

DETAILED DESCRIPTION

Before describing exemplary embodiments which illustrate the concepts, systems, circuits and techniques sought to be protected, some introductory concepts and terminology are explained.

Reference is made herein to a "virtual computer." A virtual computer is a software implementation of a physical computer (i.e. a virtual computer is a software based computer or stated differently is a computer software application that simulates a physical computer). Desktop computers, laptop computers, server computers, mobile computers, tablets, etc. are all examples of physical computers.

A physical computer is also sometimes referred to in the art as a "physical machine" (or more simply a "machine") and hence the terms "virtual computer" and "virtual machine" can be used interchangeably. The virtual machine executes programs as if it were a physical machine. Operating characteristics of a virtual machine may be based upon specifications of a hypothetical computer or the virtual machine operating characteristics may emulate the computer architecture and functions of a real world physical computer.

When a virtual machine performs the functions of a server computer, the virtual machine is referred to as a "virtual server."

The term "virtual computing services" refers to computing services provided by a virtual machine.

Reference is also made herein to a "virtual storage device" "virtual hard drive," "virtual drive," and "virtual storage." These terms refer to a software application that simulates a storage device such as a hard drive, solid state hard drive, flash drive, and the like. These terms are used interchangeably herein. The software that simulates a storage device may be part of or separate from a virtual machine.

The terms "physical storage device," "physical drive," "physical hard drive," and "physical storage" are used to describe a physical, hardware storage device such as a hard drive, solid state hard drive, flash drive, and the like. These terms are used interchangeably.

The term "software module" (or more simply a "module") refers to a unit or component of software that embodies a particular functionality or set of functionalities. A software module can be a discrete software component, such as a software application or library. A software module can also be integral to (e.g. part of) a software application, library, or another software module.

Figure 1:
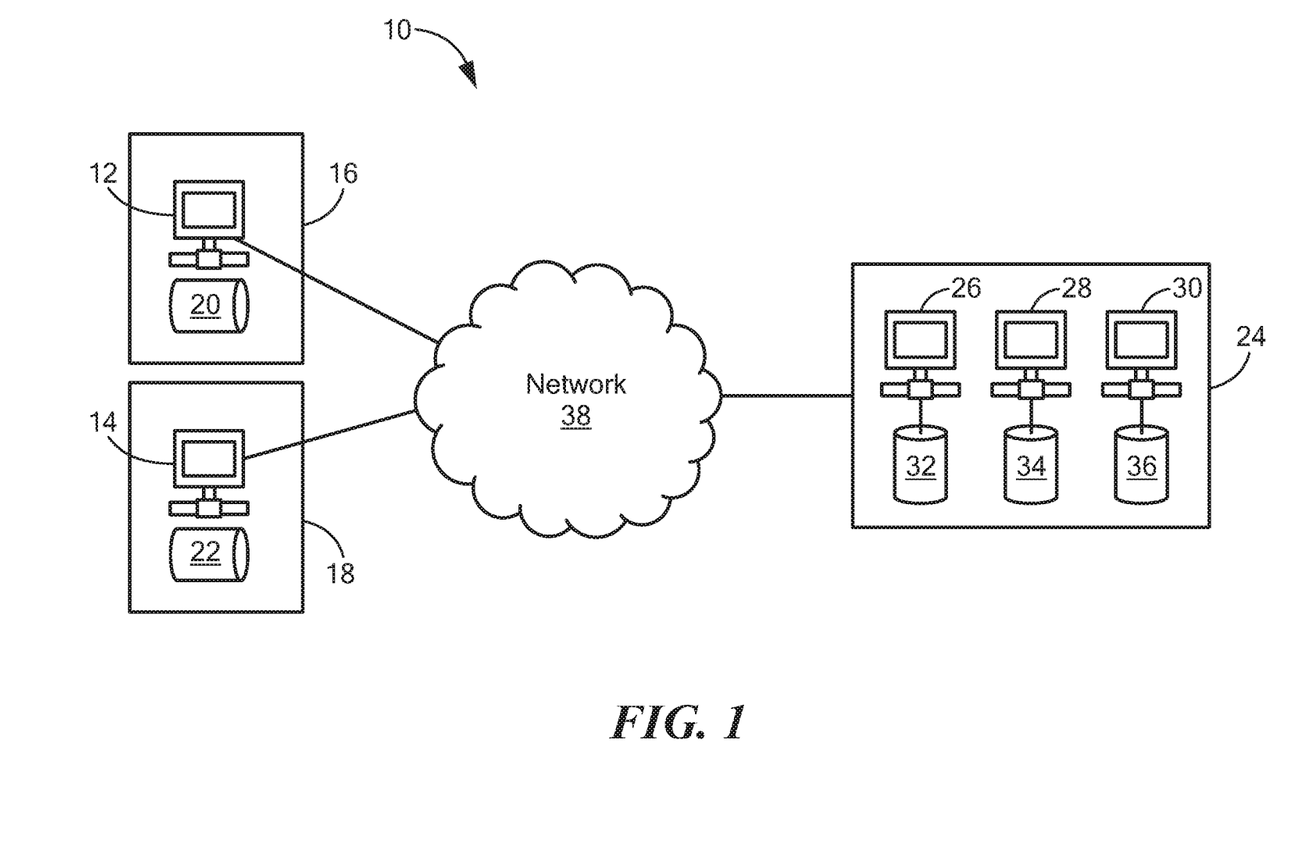
FIG. 1 is a block diagram of a computer system for providing computing services including virtual storage services.

Referring now to FIG. 1, a system for providing data storage 10 includes one or more virtual machines 12, 14 executing on respective ones of physical machines 16, 18. Here, virtual machines 12, 14 include at least one virtual storage device, 20, 22. The virtual machines 12, 14 are coupled, here though an internet 38, to at least one of physical servers 26-30 each of which includes at least one physical storage device 32-36.

Each of the at least one physical storage devices 32-26 has a data structure stored thereon. The data structures will be described in detail below in conjunction with FIG. 3. Suffice it here to say that each data structure includes at least one table of contents configured to map storage locations within the virtual storage device to node structures that provide pointers to corresponding storage locations within the physical storage device and a tree structure having a predetermined number of hierarchical levels, with each level containing node structures which contain pointers that point to other node structures or to data locations on the physical storage device. The system further includes one or more core modules (e.g. driver-like software), executed by the virtual server, the physical server or both, configured to receive requests to access data in the storage locations within the virtual storage device and, in response to the requests, traverse the data structure to access data in the corresponding storage locations within the physical storage device. In some embodiments, the core modules could be distributed between front-end and back-end portions of the system 10.

System 10 is thus configured to provide virtual computing services to a user. Typically, a user accesses virtual machines 12 and 14 and virtual machines 12, 14 emulate the functionality of a computer and provide an interface to the user so that the user can access the functionality. Virtual machines 12, 14 thus may emulate the functionality of server computers, desktop computers, laptop computers, smartphones, mobile computers such as tablets, or any other type of computing device. The particular functionality of each virtual machine is determined based upon the requirements of each particular application.

Virtual machines 12, 14 may, for example, be executed by a physical computer at the customer's physical site. For example, as shown, virtual machine 12 may be a software application executed by physical computer 16 and virtual machine 14 may be a software application executed by physical computer 18. Alternatively, virtual machines 12 and 14 may be executed by the same physical computer, which may be configured to execute multiple virtual server applications at the same time. In other embodiments, virtual machines 12, 14 may be executed by a remote computer and the user can access virtual machines 12 and 14 through a computer network, browser interface, or software application. Whether the virtual machines are located locally or remotely, the user can access the virtual machines 12 and 14 to log in, execute application, perform computing operations, or use any other type of computing service provided by virtual machines 12, 14.

Virtual machines 12 and 14 have associated virtual storage devices 20 and 22, respectively. As noted above, virtual storage devices 20 and 22 are software applications, modules, or software-based features that provide storage services. The virtual storage devices 20 and 22 may act like physical hard drives that a user can access and use. Although shown as separate elements from the virtual servers, virtual storage devices 20 and 22 may be part of a virtual server application, a feature of a virtual server application, a software module associated with the virtual servers, etc. Virtual storage devices 20, 22 may also be provided by computer software applications which are separate from computer software applications which implement virtual machines 12, 14, and may be executed by computers or computing devices other than those that execute computer software for virtual machines 12, 14. Virtual storage devices 20 and 22 can be configured to function like any type of storage device including, but not limited to, plate-based hard drives, solid state hard drives, flash drives, thumb drives, and the like. Virtual storage devices 20 and 22 can also be configured to provide backup or redundancy services like redundant array of inexpensive disk (RAID) services 0, I, V, or X, or other backup and redundancy services.

System 10 also has a so called "back-end" 24. In general back-end 24 includes a set of computers, servers, and other devices that typically are not directly accessible by a user of system 10. In the exemplary embodiment of FIG. 1, back-end 24 includes one or more physical servers 26, 28, and 30.

The physical servers 26, 28, and 30 provide computing resources such as processor time, network access, physical data storage, and other services and resources. The virtual servers 12 and 14 may draw on the services and resources provided by physical servers 26, 28, and 30 to provide computing services to a user. Physical servers (and other devices in back-end 24) may be located in a single physical location or in multiple, geographically separated, physical locations.

Physical servers 26, 28, and 30 are computers that execute operating systems and other software to provide computing services. Each physical server 26, 28, and 30 has an associated physical storage device 32, 34, 36, respectively. Each physical storage device includes an allocation table containing metadata that provides information about the physical storage device and allows the system to navigate the physical storage device to locate data. As will be described in detail in conjunction with FIG. 3 below, the metadata in the allocation table is organized in a linked data structure which can be viewed and organized as a tree.

Although in FIG. 1 a single storage device is shown to be associated with a single physical server, physical servers 26, 28, and 30 may each have multiple physical storage devices, or no physical storage devices, depending upon the services provided by the physical server. In some embodiments, at least some physical servers in back end 24 do not have an associated physical storage device.

Physical storage devices 32, 34, and 36 may be hard drives, solid state hard drives, RAID arrays, networked hard drive banks, or any other type of physical data storage device. In embodiments, physical storage devices 32, 34, and 36 are block storage devices. As known in the art, a block is a storage area having a predetermined size on a hard disk (or other storage device). In other words, data can be written to and read from physical storage devices 32, 34, and 36 by addressing blocks on the physical storage devices and by reading and writing data into the blocks in block-sized increments.

Virtual servers 12 and 14 communicate with back end 24 through a network 38. Network 38 can be a LAN, a WAN, an internet, a cellular network, a 3G or 4G network, an Infiniband®/RDMA network, or any other type of network for data communication.

In operation, network 38 allows physical servers in the back-end 24 to communicate with and provide services to virtual servers 12 and 14. For example, a user using virtual server 12 may perform an operation that stores data to virtual storage device 20. The stored data may travel through network 38 to back-end 24 where it is stored on one or more of the physical storage devices 32, 34, 36. When the user performs an operation to read data from virtual storage device 20, virtual server 12 communicates with physical servers 26, 28, and/or 30 over network 38 to retrieve the data and provide it to the user. By accessing the virtual server 12, it appears to the user that the data is stored on virtual storage device 20 while, in actuality, the data is stored in the back end 24 on physical storage devices 32, 34, and 36 and accessed through network 38.

Figure 2:
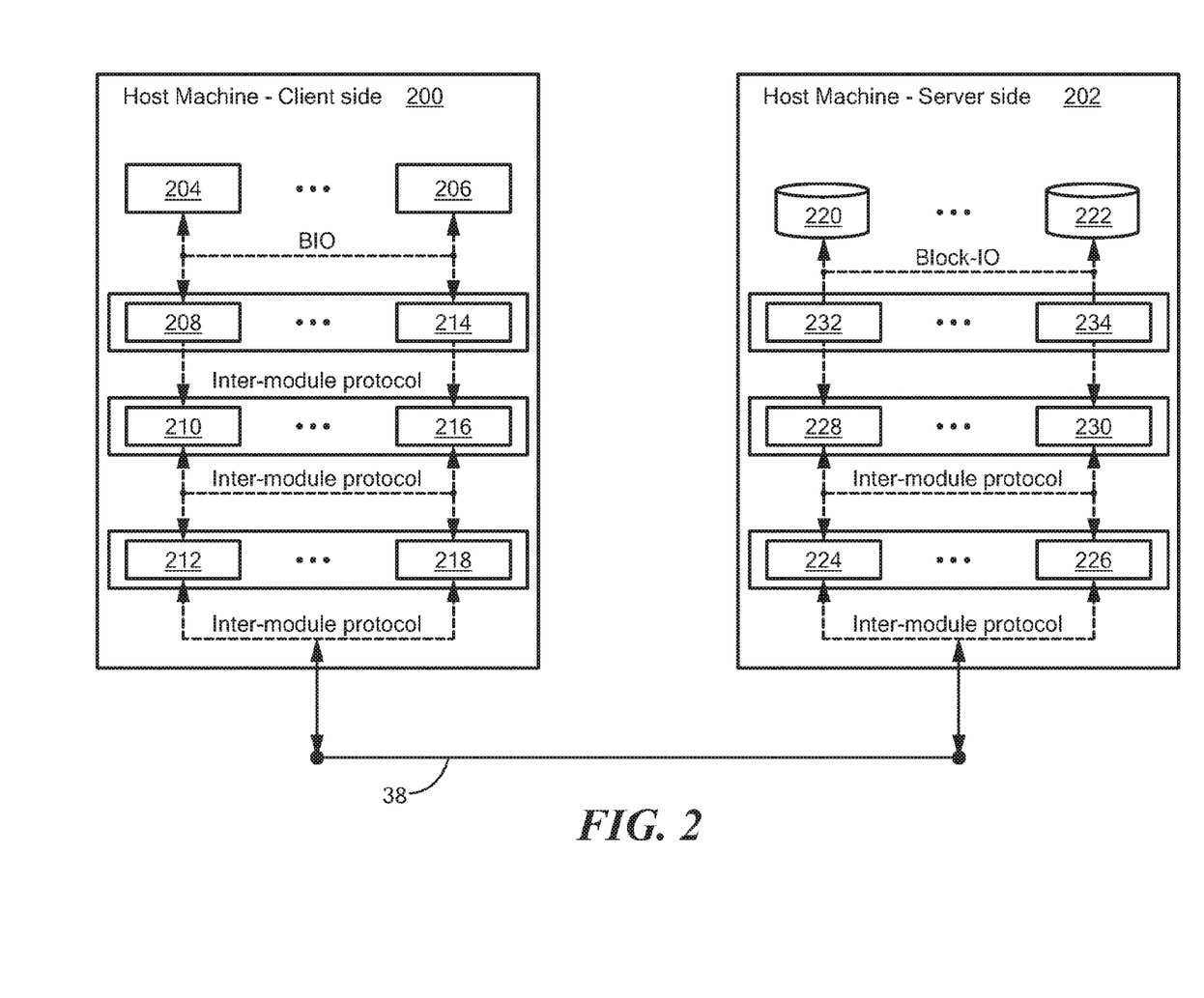
FIG. 2 is another block diagram of a computer system for providing computing services including virtual storage services.

FIG. 2 illustrates a client-side host machine 200 and a back-end host machine 202. Host machine 202 is a computing device that is executing virtual machines 204 and 206. Virtual machines 206 may be the same as or similar to virtual machines 12 and 14 in FIG. 1.

Each virtual machine 204 and 206 executes various software modules. For example, virtual machine 204 is shown executing software modules 208, 210, and 212; and virtual machine 206 is shown executing software modules 214, 216, and 218. These modules provide functionality that allows virtual machines 204 and 206 to read and write data to a virtual storage device, and to communicate with the physical servers that store the data utilizing a linked data structure an example of which will be described herein below in conjunction with FIG. 3.

In an embodiment, modules 208 and 214 are main storage modules. The main storage modules provide a storage interface for applications and other programs that access data on the virtual storage device. For example, consider a word processor application executing or a processor. The word processor program performs file IO operations to read and write files to the computer's physical hard drive. However, virtual machine 204 does not have a physical hard drive. If the same word processor program is running on the virtual machine 204, storage module 208 can provide a file IO interface that the word processor can use to read and write data to a virtual hard drive. The word processor can access software functions and hooks provided by storage module 208 to perform the file IO that it would normally perform to access a physical hard drive.

In the exemplary embodiment of FIG. 2, modules 210 and 216 respond to redistribution modules which manage requests to lower drive access layers and obtain virtual block addresses to reach the storage target. For example, when main storage module 208 performs an operation to read or write to the virtual hard drive, main storage module 208 may communication with redistribution module 210. The distribution modules then receive the read or write request and obtain block addresses to read or write. The block addresses obtained by redistribution module 210 are virtual block addresses, i.e. they are addresses for blocks on the virtual storage device (e.g. virtual storage device 20 or 22 in FIG. 1). The redistribution modules then pass the read/write request along with the virtual drive block addresses to modules 212 and 218.

In the exemplary embodiment of FIG. 2, modules 212 and 218 are client communication modules. These client communication modules receive requests to read and write block addresses from the redistribution modules 210 and 216. The client communication modules 210 and 216 then communicate these read and write requests to the physical servers (e.g. physical server 200) via network 38. Client communication modules 210 and 216 provide communication between the redistribution modules 210, 214 and the network 38. Client communication modules 210 and 218 also handle the timing and order of read and write requests sent and received via network 38. In embodiments, client communication modules 210 and 218 communicate over network 38 via custom protocols, industry standard protocols, protocols based on remote direct memory access (RDMA) protocols, etc.

Back-end host machine 202 is a physical processing device which functions as a storage server in the exemplary embodiment of FIG. 2. Host machine 202 may be the same as or similar to physical servers 26, 28, and/or 30 in FIG. 1. As shown in FIG. 2, host machine 202 has one or more physical storage devices (e.g. physical storage devices 220 and 222). Physical storage devices 220 and 222 may be hard drives, solid state drives, flash drives, RAID arrays, or any type physical storage device. Physical storage devices 220 and 222 are preferably non-volatile storage devices, but can be volatile storage devices if desired.

When virtual machine 204 reads data from or writes data to a virtual drive, the read/write (RW) request and the data are sent to host machine 202 over network 38. When host machine 202 receives the data and RW request, host machine 202 reads or writes the data to physical storage device 220, physical storage device 222, or both. In order to process the RW request, host device executes various software modules including, but not limited to server modules 224 and 226, core modules 228 and 230, and cache modules 232 and 234.

Server modules 224 and 226 are software modules that provide communication over network 38 and handle incoming read and write requests from virtual machines 204 and 206. Server modules 224 and 226 also handle outgoing responses to the requests that are sent by host machine 202 to virtual machines 204 and 206. Server modules 224 and 226 manage the timing and order of the incoming requests and outgoing responses and handle communications over network 38.

Core modules 228 and 230 receive incoming read/write requests from server modules 212 and 218 and utilize a linked data structure, an example of which is described below in conjunction with FIG. 3. When core modules 228 and 230 receive the read/write request, the read/write request contains block addresses that point to blocks in the virtual drive. Core modules 228 and 230 translate the virtual block addresses into physical block addresses that can be used to access data on physical storage devices 220 and/or 222. As noted above, this mechanism for translating between virtual block addresses and physical block addresses will be described below in greater detail (e.g. in conjunction with FIG. 3).

The read/write requests are then passed to the cache modules 232 and 234. Cache modules 232 and 234 perform the read/write requests by reading and/or writing data to the physical storage devices 220 and 222. Cache modules 232 and 234 also cache data that is read from or written to physical storage devices 220 and 222 in order to increase speed of the read/write operations.

The software modules depicted in the exemplary embodiment of FIG. 2 may utilize queue based communications. For example, a read request generated by virtual machine 204 will be placed in a queue to be received and processed by storage module 208. Once processed, the request will be placed in a queue to be received and processed by redistribution module 210. Once processed by redistribution module 210, the request will be placed in a queue to be received and processed by communications module 212. If a response is received from host machine 202, the response may be processed by software modules 212, 210, and 208 in an opposite direction. That is, the response is first placed in a queue to be received and processed by communications module 212. Once communications module 212 processes the response, the response is placed in a queue to be received and processed by redistribution module 210. Once redistribution module 210 processes the response, the response is placed in a queue to be received and processed by storage module 208. Once the response is processed by storage module 208, the response is placed in a queue to be received by virtual machine 204 and/or an application executing on virtual machine 204.

The other software modules in FIG. 2 may also use queue-based communication schemes. For example, requests received, processed, or sent by server-side cache modules 232 and 234, core modules 228 and 230, and server modules 224 and 226 may be placed in queues for processing.

A single physical storage device may contain data belonging to multiple virtual storage devices. In other words, multiple virtual storage devices may store their data on the same physical storage devices. Additionally or alternatively, a virtual storage device may contain data that is stored on multiple physical storage devices. In order to maintain and access the data stored on a physical storage device, each storage device includes a table of contents (TOC) data structure. Accordingly, if the virtual storage device is contained on multiple physical storage devices, the size of the virtual storage device may exceed the available storage on any particular physical storage device.

Figure 3:
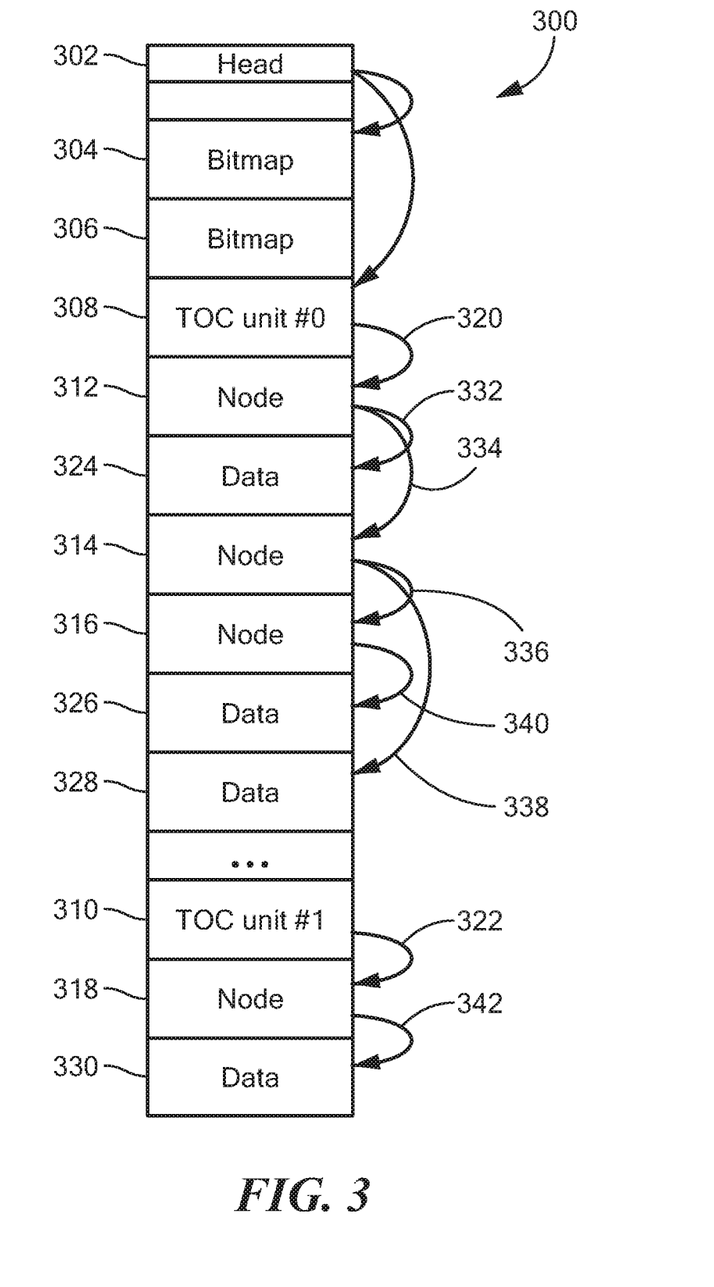
FIG. 3 is a data layout for a data structure used to organize data on a physical storage device.

Referring now to FIG. 3, in an embodiment, each physical storage device contains metadata that provides information about the physical storage device and allows the system to navigate the physical storage device to locate data. As noted above, the metadata in the allocation table is organized in a linked data structure which can be viewed and organized as a tree. Data layout 300 contains a header 302 and one or more bitmaps 304 and 306. Header 302 provides an entry or starting point for the linked data structure. In an embodiment, the header is 64K bytes in length and contains metadata that can be used to store information about the physical storage device, the host server, etc. Header 302 is located at the same address on every physical storage device so that the system can predictably find an entry into the allocation table 301. In an embodiment, header 302 is located at address 0 (e.g. block 0) of each physical storage device. In another embodiment, header 302 follows immediately after the master boot record (MBR) of the physical storage device. The following table provides an exemplary data layout of header 302:

| | |
|---|---|
| signature | pre-defined signature. (8 bytes) |
| revision | pre-defined revision (1.0) (4 Bytes) |
| header_size | size of this header (in little-endian) (4 Bytes) |
| header_crc | CRC32 checksum of this header (4 Bytes) |
| current_lba | sector offset of this header copy (8 Bytes) |
| backup_lba | sector offset of another header (8 Bytes) |
| first_lba | first usable sector address (LBA) (8 Bytes) |
| last_lba | last usable sector address (LBA) (8 Bytes) |
| disk_uuid | this disk's GUID (UUID) (16 Bytes) |
| part_array_start | partition entries array (8 Bytes) |
| part_array_length | number of valid partition entries (4 Bytes) |
| part_entry_size | size of GPT partition entry (4 Bytes) |
| part_array_crc | CRC32 checksum of the partition array region (4 Bytes) |

In one exemplary embodiment, the bitmaps are also 64K bytes in length.

When large amounts of data are involved, the data layout typically includes one or more table of contents (TOC) units. Data layout 300 of FIG. 3, for example, contains one or more table of contents (TOC) units 308 and 310. Each TOC unit is associated with a virtual storage device. For example, TOC unit 308 may contain information for accessing data stored into virtual storage device 20 by virtual machine 12 (see FIG. 1) and TOC 310 may contains information for accessing data stored into virtual storage device 22 by virtual machine 14 (see FIG. 1). The following table provides an exemplary data layout for TOC 310:

| Name | Length | Description |
|---|---|---|
| block header | 8 Bytes | common block header |
| length | 8 Bytes | size of the whole TOC |
| previous TOC | 8 bytes | address to the previous TOC node (in sector) |
| next TOC | 8 bytes | address to the next TOC node (in sector) |
| array of disk entries | 168*n bytes | pointers to data blocks |
| total | 86048 bytes | |

In one embodiment, each TOC corresponds to a top-level entry point for accessing the data stored in the associated virtual drive. In other words, TOC units 308 and 310 act as entry points for a linked data structure that can be used to access all the data stored in a particular virtual drive.

TOC units 308 and 310 contain pointers to node structures 312, 314, 316, and 318. In the example shown in FIG. 3, TOC unit 308 contains a pointer to node structure 312 (indicated by arrow 320) and TOC unit 310 contains a pointer to node structure 318 (indicated by arrow 322).

Node structures are data structures that contain pointers to other node structures and/or pointers to data blocks. Node structures can vary in size and can hold a variable number of pointers. Data blocks are sections of a physical storage device in which data is stored. When a user reads or writes to a virtual device, the data accessed by the user is stored in data blocks, such as data blocks 324, 326, 328, and/or 330, on the physical storage device. Data blocks can vary in size. In one embodiment, each data block has a size that is an integer multiple of the physical storage device's block size.

As shown in FIG. 3, Node structure 312 contains a pointer to data block 324 (indicated by arrow 332) and a pointer to node structure 314 (indicated by arrow 334). Node structure 314 contains a pointer to node structure 316 (indicated by arrow 336) and a pointer to data block 328 (indicated by arrow 338). Node structure 316 contains a pointer to data structure 326 (indicated by arrow 340). Node structure 318 contains a pointer to data structure 330 (indicated by arrow 342).

Although the node structures in FIG. 3 are shown with only one or two pointers to other node structures or data blocks, node structures can contain multiple pointers. In various embodiments, node structures such as node structure 312 and the like can contain hundreds, thousands, or hundreds of thousands of pointers to other node structures and data blocks. For example, assume that the physical storage device has a block size of one megabyte, each pointer is 48 bytes, and node structure 312 has a size of 10 blocks. In this case, node structure 312 may contain approximately 10*1 Megabyte/48 bytes of pointers. In other words, node structure 312 may contain over 200,000 pointers.

Figure 4A:
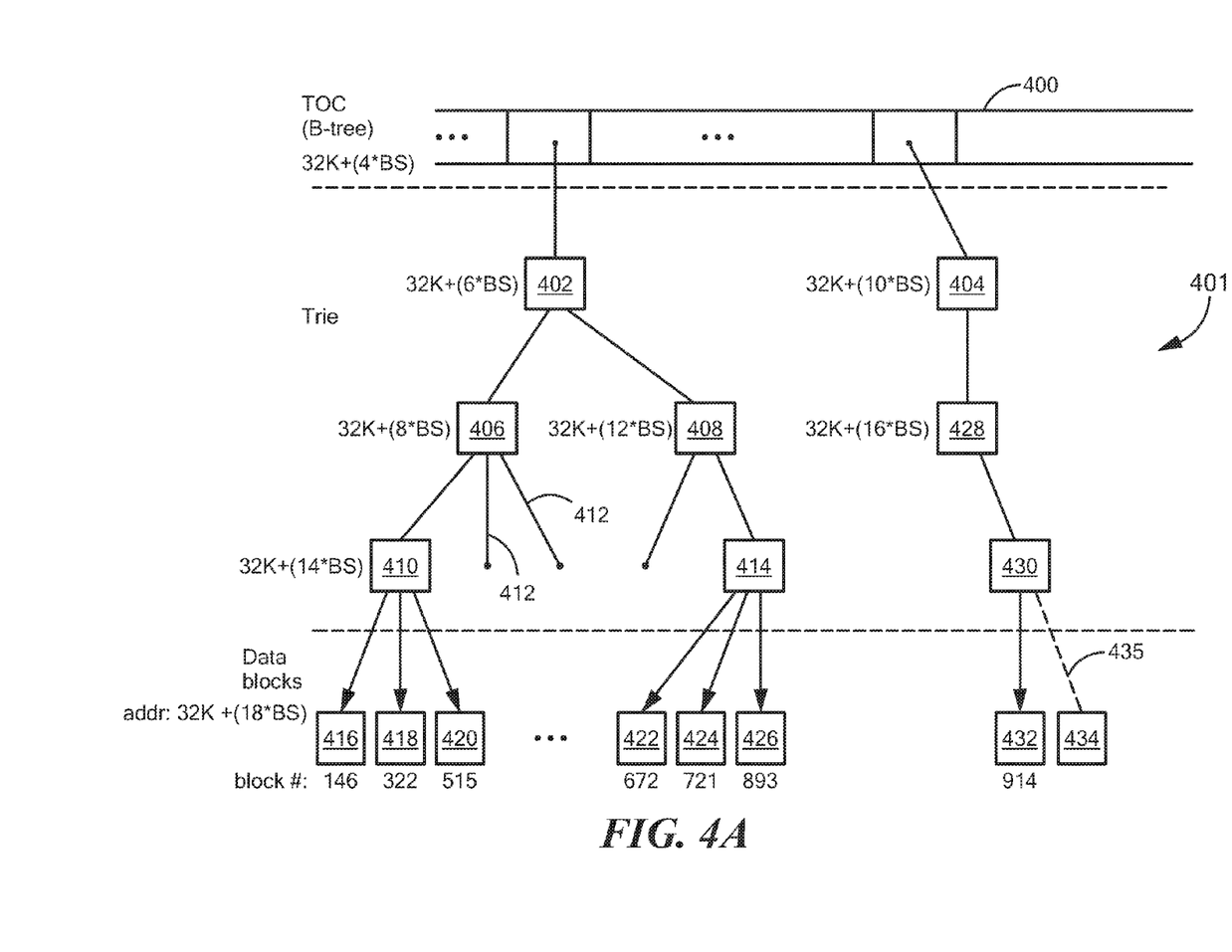
FIG. 4A and FIG. 4B are tree diagrams of a data structure used to organize data on a physical storage device.

As noted above, TOC units may be implemented as linked data structures such as tree structures. In FIG. 4A, an example TOC unit 400 is represented as a tree structure 401. The tree structure 401 is used to organize and access data stored on the physical storage device. Each read or write request received will contain an address that is to be read or written. The address provides a path through the tree structure 401 that can be traversed in order to access the data stored in data blocks on the physical storage device.

In an embodiment, the address is a block number that can be used to traverse the tree. For example, the system can traverse the levels of the tree until the block matches a pointer to a datablock. Thus any given block number may only require a number of lookups equal to the number of levels in the tree before the datablock can be identified and read.

As shown in FIG. 4A, TOC unit 400 contains pointers to node structures 402 and 404. Node structure 402 contains pointers to node structures 406 and 408. Node structure 406 contains a pointer to node structure 410, as well as points to an as yet un-instantiated node structures (as indicated by lines 412). Node structure 408 contains a pointer to node structure 414. Node structure 410 contains pointers to data blocks 416, 418, and 420; and node structure 414 contains pointers to data blocks 422, 424, and 426.

In the tree structure on the right-hand side of FIG. 4A, node structure 404 contains a pointer to node structure 428, which contains a pointer to node structure 430, which contains a pointer to data block 432. As noted above, the node structures are data structures that contain pointers to other node structures or to data blocks, and the data blocks are blocks on the physical storage device where data can be stored.

The tree data structures may contain a fixed, predetermined number of levels, i.e. a fixed depth. In the exemplary embodiment of FIG. 4A, tree structure 401 is provided having three levels with nodes 402 and 404 in a first level of the tree, node structures 406, 408, and 428 in a second level of the tree, and nodes 410, 414, and 430 in a third level of the tree. Defining a predetermined number of levels for the tree may result in a tree structure that is relatively small in size. In an embodiment, the tree structure may be sufficiently small so that it can be held in volatile memory. In an embodiment, the tree structure may be less than 10 megabytes. Also, the tree structure may be dynamically held in memory so that less frequently used parts get removed from memory again.

Figure 4B:
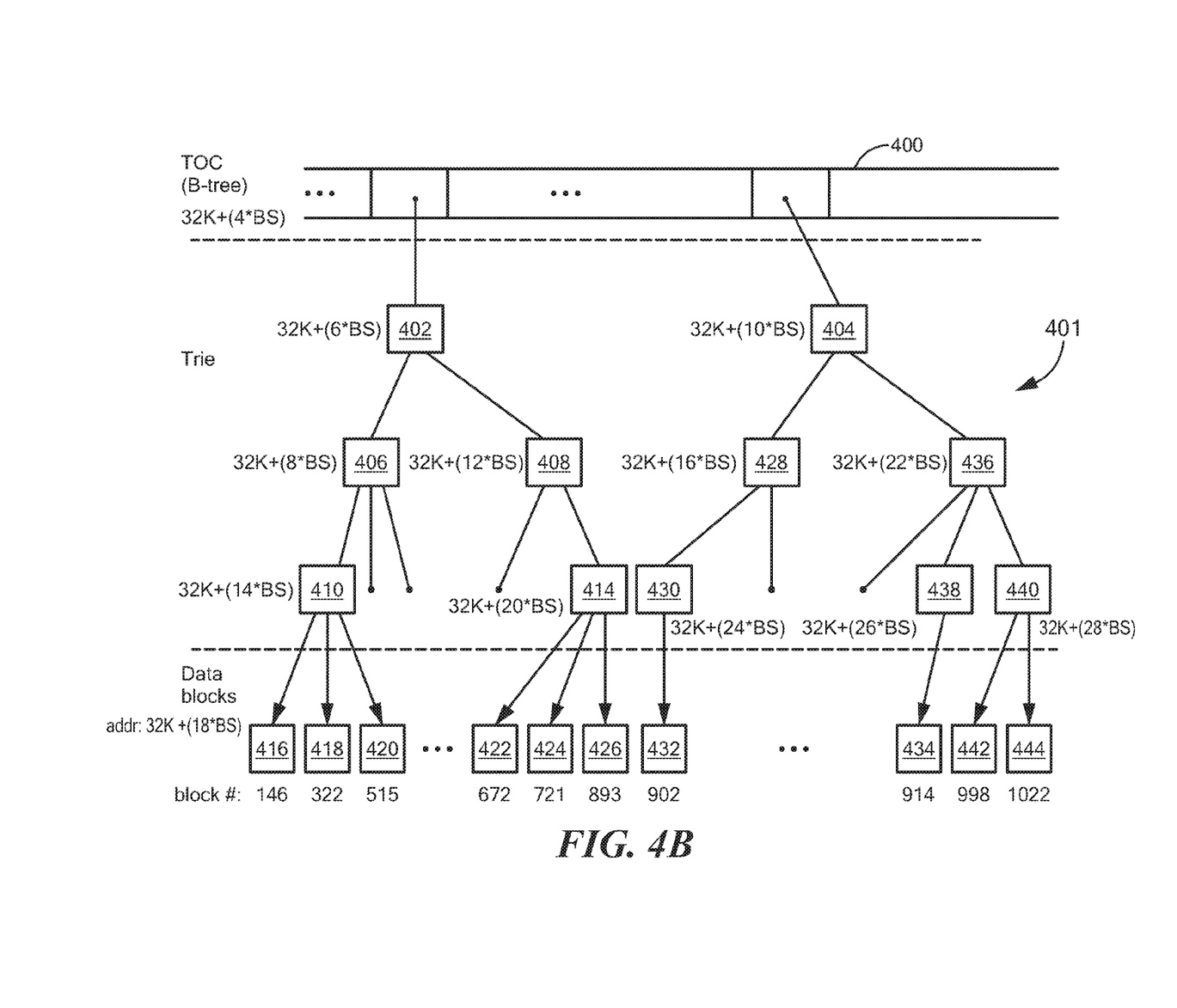

Additionally, the predetermined depth of tree structure 401 can result in a predetermined look-up time. For example, when a read or write operation is requested, the core module 228, 230 traverses the tree structure 401. If the tree has a predetermined depth, the time it takes to traverse the tree structure 401 will also be predetermined. In FIG. 4B, the tree structure 401 has three levels of node structures. In other embodiments, tree structure 401 can have fewer or more than three levels of node structures, as desired. Factors included in selecting the number of levels in the tree comprise: the amount of diskspace to be addressed by the tree, the overhead of the metadata in comparison to the payload data, the speed of lookups, the speed in which new nodes are created on-the-fly, etc.

Providing a tree structure having a fixed, predetermined number of levels also allows the system, when traversing the tree, to know how many levels must be traversed in order to access data. This can make accessing the data deterministic. The type of item (i.e. whether the item is a node or a data block) can be determined by its position in the tree. In the example shown in FIGS. 4A and 4B, as the system traverses the tree, the system will always access three levels of node structures before accessing the data blocks.

When a read or write operation is requested from the virtual drive associated with TOC unit 400, the core module (e.g. core module 228 or 230 in FIG. 2) traverses tree structure 401 to access the necessary data block. Assume, for example, the core module receives a request to read the data in data block 432. The read request includes a read address. The read address will contain instructions to traverse the tree to node 404, then to node 428, then to node 430, then to data block 432. After the core module locates data block 432, the data can be read from or written to data block 432.

In one embodiment, space on the physical drive is not allocated to a virtual drive until the space is needed or used. Such a dynamic allocation technique saves space on the physical storage device. If the storage space is never used by the virtual drive, then the space need not be allocated on the physical storage device. Accordingly, in an embodiment, tree structure 401 points only to data blocks on the physical storage device where data has already been written. Tree structure 401 may include null pointers for addresses in the virtual drive that have not yet been allocated space on the physical drive. When the address in the virtual drive is first used, the system can allocate the appropriate space on the physical drive, update the tree structure 401 to point to the newly allocated space, and perform read/write operations to the newly allocated space.

FIGS. 4A and 4B provide an example of using tree structure 401 to dynamically allocate additional blocks on the physical storage device. Assume block 434 in FIG. 4A has not yet been allocated. When a write request that requires additional space is received, the core module will traverse the tree 401 to allocate the additional space. If there are null pointers available in node structure 430, the system may simply store the address of newly allocated block 434 in the null pointer, as indicated by dotted line 435. However, if no additional pointers are available in node structure 430, the system may traverse back up the tree to create additional node structures, as shown in FIG. 4B.

Turning to FIG. 4B, if no additional pointers are available node structure 430, the core module may traverse back up the tree to node 428. If node 428 has additional pointers available, the core module may create a new node structure that is a child of node structure 428. In this example, assume that node structure 428 also does not have any addition pointers available. In this case, the core module may traverse back up the tree to node structure 404. Assuming that node structure 404 has a pointer available, the core module will create a new node 436 and a new node 438, which points to the newly allocated node 434. As additional space is needed, the core module may repeat the process to allocate additional nod structures (such as node structure 440) which point to additional data blocks (such as data blocks 442 and 444).

If a read request is received for a data block that has not been written or allocated, the core module may return an error condition, or may return all "0"s instead of returning the data in the data block. This can provide a safety mechanism so that data is not inadvertently passed to a user unintentionally. If, for example, data was written to a particular data block, and subsequently the data block was de-allocated. This may happen, for example, if a virtual drive that was being used is subsequently deleted. When the drive is deleted, the TOC unit associated with the virtual drive may be deleted, but the data stored on the drive may or may not be wiped clean. If data blocks associated with the deleted virtual drive are allocated to a new virtual drive before the data blocks are wiped clean, a read request could return the data in the data block to the user. To prevent this from occurring, if a data block is newly allocated but has not yet been written, the system may return an error condition or all "0"s in response to a request to read the data block.

Figure 5:
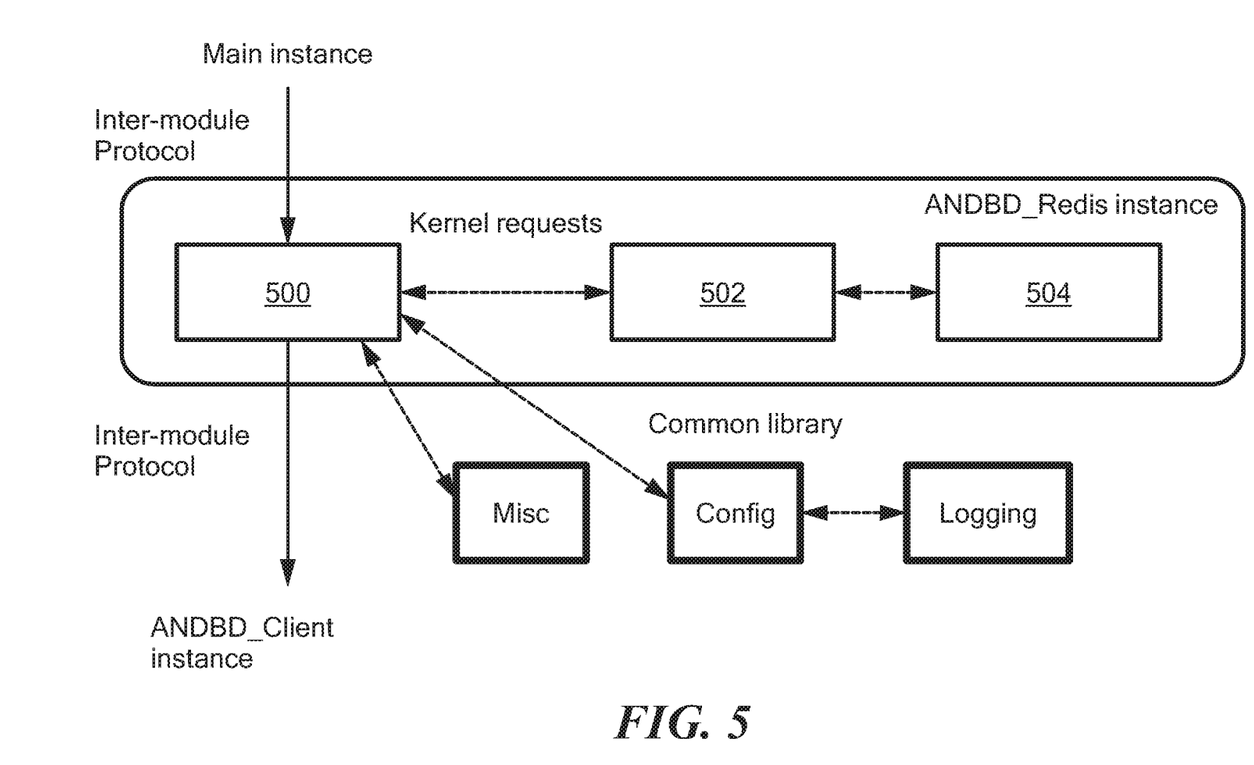
FIG. 5 is a block diagram of a software module for addressing data in a virtual storage device.

Referring to FIG. 5, a replication module 500 is shown in communication with other software modules. Replication module 500 may be the same as or similar to replication modules 210 and 216 (FIG. 2). As described above, when replicator module 500 processes read and write requests, it generates a block address for a virtual storage device. Also as noted above, virtual storage devices can be stored on one or more physical hard drives across a pool of physical hard drives and servers. The pool of drives and servers can be very large, making it difficult or time consuming to locate the correct physical hard drives and servers. In order to efficiently locate the physic hard drive(s) on which the virtual storage device and data is stored, replication module 500 may communicate with a disk locator module 502. The disk locator module 502 may access a disk locator library 504. The disk locator library 504 can contain a function that can deterministically identify the physical disk(s) on which the data is stored.

In an embodiment, disk locator library 504 can identify the physical disk(s) on which the data is stored algorithmically, without accessing a central database or data store. In other words, the function that identifies the physical disk(s) is a quasi-mathematical function of the form $f(x)=y$, where f is the function, x is the inputs, and y is the outputs. Without accessing an external database, disk locator library 504 receives inputs from disk locator module 502, processes the inputs, and produces an output that identifies the disks on which the data is stored. In an embodiment, disk locator library 504 uses the CRUSH algorithm to identify the disks.

As an example, the system may send one or more of the virtual volume id, virtual block number, version number, customer ID, etc. as inputs to the CRUSH algorithm. In response the CRUSH algorithm may return the storage server and storage disk where the data resides.

Figure 6:
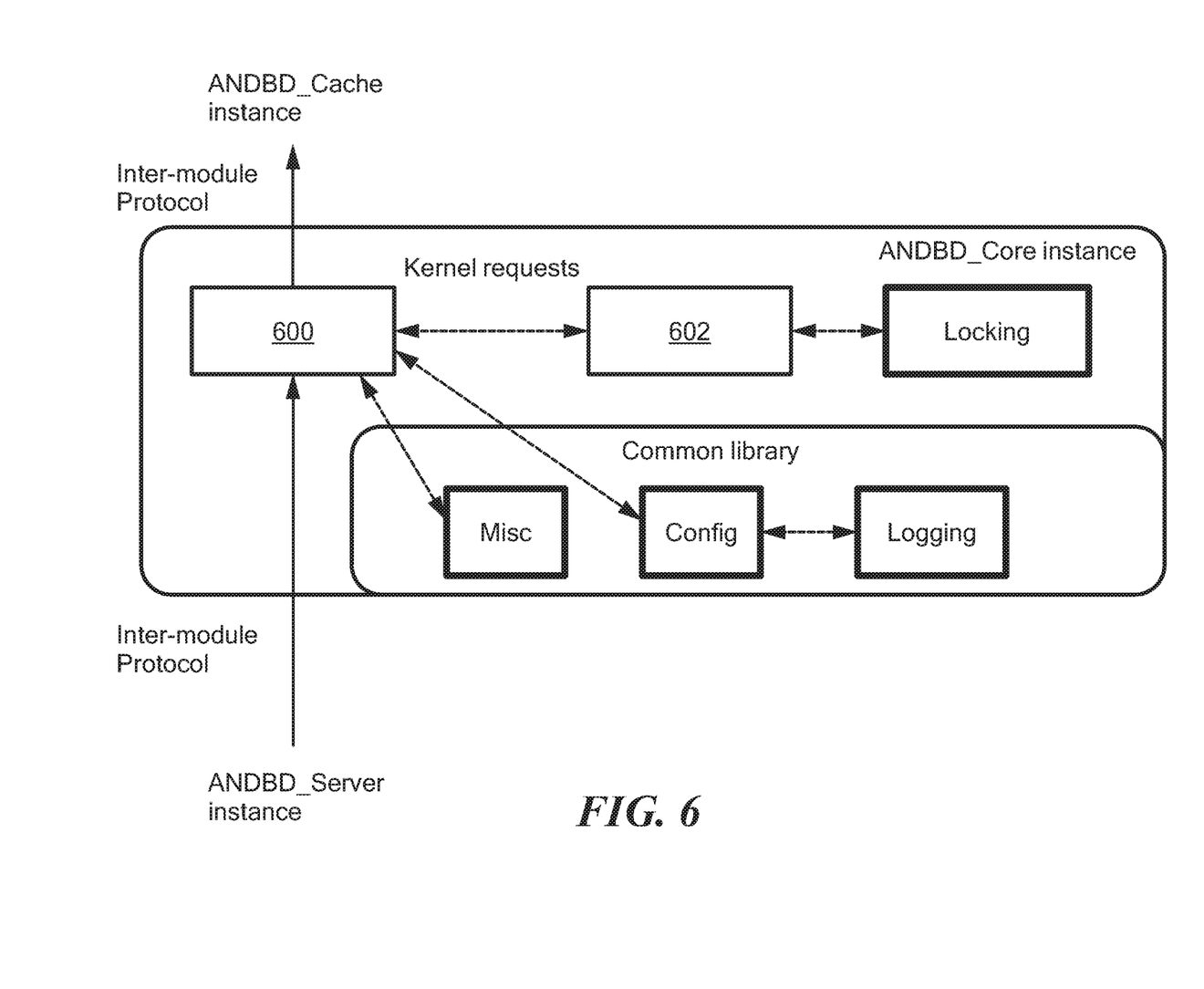
FIG. 6 is a block diagram of a software module for addressing data in a physical storage device.

Referring to FIG. 6, a core module 600 is shown in communication with other software modules. Core module 600 may be the same as or similar to core modules 228 and 230 (FIG. 2). As described above, when core module 600 receives a read or write request, it translates the virtual storage device address into a physical block address so that the system can access the data stored on the physical storage devices. In order to translate the address, core module 600 communicates with a tree traversal module 602. The tree traversal module traverses the TOC tree as described above, to find the block address of the physical drive where the data is stored. As noted above, if a write request is received and the block has not yet been written, tree traversal module 602 will allocate new blocks; update the tree, adding node structures and pointers, so that the tree points to the newly allocated blocks. Additionally, if a read request is received for a block that has not yet been written, tree traversal module 602 will return an error condition, all "0"s, or a null pointer so that the read operation does not return data from a block that has not yet been written.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

The systems and methods described herein may be implemented hardware, software, or a combination. Software may comprise software instructions stored on one or more computer readable medium which, when executed by one or more processors, cause the processors to perform operations that implement the systems and methods.

The invention claimed is:

1. A system for providing data storage, the system comprising:
    at least one virtual server comprising at least one virtual storage device;
    at least one physical server comprising at least one physical storage device;
    a data structure, stored on each of the at least one physical storage devices, the data structure comprising:
        at least one table of contents, the table of contents configured to map storage locations within the virtual storage device to node structures that provide pointers to corresponding storage locations within the physical storage device; and
        a tree structure having a predetermined number of hierarchical levels, each level containing node structures, the node structures containing pointers that point to other node structures or to data locations on the physical storage device; and one or more core modules executed by the virtual server, the physical server or both, configured to receive requests to access data in the storage locations within the virtual storage device and, in response to the requests, traverse the data structure to access data in the corresponding storage locations within the physical storage device.

2. The system of claim 1 wherein the at least one virtual storage device is block addressable.

3. The system of claim 2 wherein the one or more core modules are configured to translate block addresses of the virtual storage device into block address of the at least one physical storage device.

4. The system of claim 1 wherein the tree structure has three levels of node structures.

5. The system of claim 1 wherein each table of contents structure is associated with a single virtual storage device.

6. The system of claim 1 wherein the one or more physical storage devices have more than one table of contents stored thereon.

7. The system of claim 1 wherein the node structures have a size that is a multiple of a block size of the physical storage device.

8. The system of claim 1 wherein the node structures in a last hierarchical level contain pointers to data blocks, and the node structures in the remaining hierarchical levels contain pointers to other node structures.

9. The system of claim 1 wherein the one or more core modules are further configured to allocate additional storage locations in the physical storage device in response to a request to write data that requires additional storage space.

10. The system of claim 9 wherein the one or more core modules are further configured to dynamically update the tree structure to point to the newly allocated additional storage locations in response to the request.

11. The system of claim 1 wherein the one or more core modules are further configured to process requests to read and write data to the physical storage device.

12. A method for providing data storage, the method comprising:

executing, by a computing device, at least one virtual server comprising at least one virtual storage device;

at least one physical server comprising at least one physical storage device;

storing, on at least one physical storage device coupled to a physical server, a data structure comprising:

at least one table of contents, the table of contents configured to map storage locations within the virtual storage device to node structures that provide pointers to corresponding storage locations within the physical storage device; and a tree structure having a predetermined number of hierarchical levels, each level containing node structures, the node structures containing pointers that point to other node structures or to data locations on the physical storage device; and executing, by the virtual server, the physical server, or both, a software driver configured to receive requests to access data in the storage locations within the virtual storage device and, in response to the requests, traverse the data structure to access data in the corresponding storage locations within the physical storage device.

13. The method of claim 12 wherein the at least one virtual storage device is block addressable.

14. The method of claim 13 wherein executing the software driver includes translating block addresses of the virtual storage device into block address of the at least one physical storage device.

15. The method of claim 12 wherein the tree structure has three levels of node structures, and traversing the tree structure includes traversing the three levels.

16. The method of claim 12 further comprising associating each table of contents structure with a single virtual storage device.

17. The method of claim 12 further comprising storing more than one table of contents stored on the physical storage device.

18. The method of claim 12 further comprising storing each node structure in one or more blocks of the physical storage device, wherein the node structures have a size that is a multiple of a block size of the physical storage device.

19. The method of claim 12 wherein executing the software driver comprises allocating additional storage locations in the physical storage device in response to a request to write data that requires additional storage space.

20. The method of claim 19 wherein executing the software driver comprises dynamically updating the tree structure to point to the newly allocated additional storage locations in response to the request.

21. The method of claim 12 wherein executing the software driver comprises processing requests to read and write data to the physical storage device.

* * * * *